US009301252B2

(12) United States Patent
Narasimha et al.

(10) Patent No.: US 9,301,252 B2
(45) Date of Patent: Mar. 29, 2016

(54) REDUCING POWER CONSUMPTION BY A WIRELESS COMMUNICATION DEVICE WITH MULTIPLE WIRELESS COMMUNICATION MODEMS

(71) Applicant: MOTOROLA MOBILITY LLC, Libertyville, IL (US)

(72) Inventors: Murali Narasimha, Vernon Hills, IL (US); Roger W. Ady, Chicago, IL (US); Iqbal Arshad, South Barrington, IL (US); Ravi Kuchibhotla, Gurnee, IL (US); Robert T. Love, Barrington, IL (US); Jiri Slaby, Buffalo Grove, IL (US); Jason P. Wojack, Libertyville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 186 days.

(21) Appl. No.: 14/103,206

(22) Filed: Dec. 11, 2013

(65) Prior Publication Data
US 2015/0131502 A1    May 14, 2015

Related U.S. Application Data

(60) Provisional application No. 61/902,507, filed on Nov. 11, 2013.

(51) Int. Cl.
| | |
|---|---|
| *H04W 52/02* | (2009.01) |
| *H04W 60/00* | (2009.01) |
| *H04W 88/06* | (2009.01) |
| *H04W 68/00* | (2009.01) |
| *H04W 76/04* | (2009.01) |

(52) U.S. Cl.
CPC .......... *H04W 52/0212* (2013.01); *H04W 60/00* (2013.01); *H04W 68/00* (2013.01); *H04W 76/04* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,539,519 B2 | 5/2009 | Ko et al. | |
| 7,912,497 B2 * | 3/2011 | Isidore | H04M 1/72519 455/127.4 |
| 8,718,243 B1 * | 5/2014 | Trandal | H04L 29/06027 370/352 |
| 8,934,881 B2 * | 1/2015 | Isidore | H04M 1/72519 455/416 |

(Continued)

FOREIGN PATENT DOCUMENTS

WO    2013044958 A1    4/2013

*Primary Examiner* — Eunsook Choi
(74) *Attorney, Agent, or Firm* — Morris & Kamlay LLP

(57) ABSTRACT

A method that reduces power consumption in a wireless communication device having a first and a second modem. The method includes detecting access to a communication network via the second modem, and in response to that detection: establishing a communication channel between the second modem and a communication service over a communication network; and triggering the first modem to enter a sleep state. The communication service is configured to respond to receipt at the communication service of an incoming communication to be routed to the first modem via a first communication network by: (i) automatically transmitting a notification via the communication channel to the second modem and (ii) forwarding the incoming communication via the first communication network to the first modem. The method then includes, in response to receipt of the notification at the device: awakening the first modem to an active state to enable receipt of the incoming communication.

23 Claims, 7 Drawing Sheets

(56) References Cited

U.S. PATENT DOCUMENTS

| | | |
|---|---|---|
| 2004/0167987 A1 | 8/2004 | Reese et al. |
| 2005/0080914 A1 | 4/2005 | Lerner et al. |
| 2006/0068785 A1 | 3/2006 | Kamijo et al. |
| 2006/0234693 A1* | 10/2006 | Isidore .............. H04M 1/72519 455/422.1 |
| 2010/0291966 A1 | 11/2010 | Hu et al. |
| 2011/0222523 A1 | 9/2011 | Fu et al. |
| 2012/0315886 A1 | 12/2012 | Lin |

* cited by examiner

US 9,301,252 B2

REDUCING POWER CONSUMPTION BY A WIRELESS COMMUNICATION DEVICE WITH MULTIPLE WIRELESS COMMUNICATION MODEMS

BACKGROUND

1. Technical Field

The present disclosure generally relates to wireless communication devices and in particular to reducing power consumption by modems operating within wireless communication devices.

2. Description of the Related Art

Cellular modems generally consume more power on a wireless communication device than wireless fidelity (WiFi) modems. Also, cellular data usage generally costs more than WIFI data usage. A power consumption challenge also exists with users of current wireless operator networks that operate using 4G technology and/or one of the older wireless technologies. For example, some wireless carriers provide both 4G LTE and CDMA 1xRTT wireless services. The user equipment subscribed to and/or operating within these carriers has to engage in various activities for each different radio connection. These activities can include independently scanning, monitoring of control and broadcast info, and performing cell change and/or reselection for each radio connection. Managing the various activities for both radio access technologies (RATs) drains power excessively.

BRIEF DESCRIPTION OF THE DRAWINGS

The disclosure will best be understood by reference to the following detailed description of illustrative embodiments when read in conjunction with the accompanying drawings, wherein.

DETAILED DESCRIPTION

Figure 1:
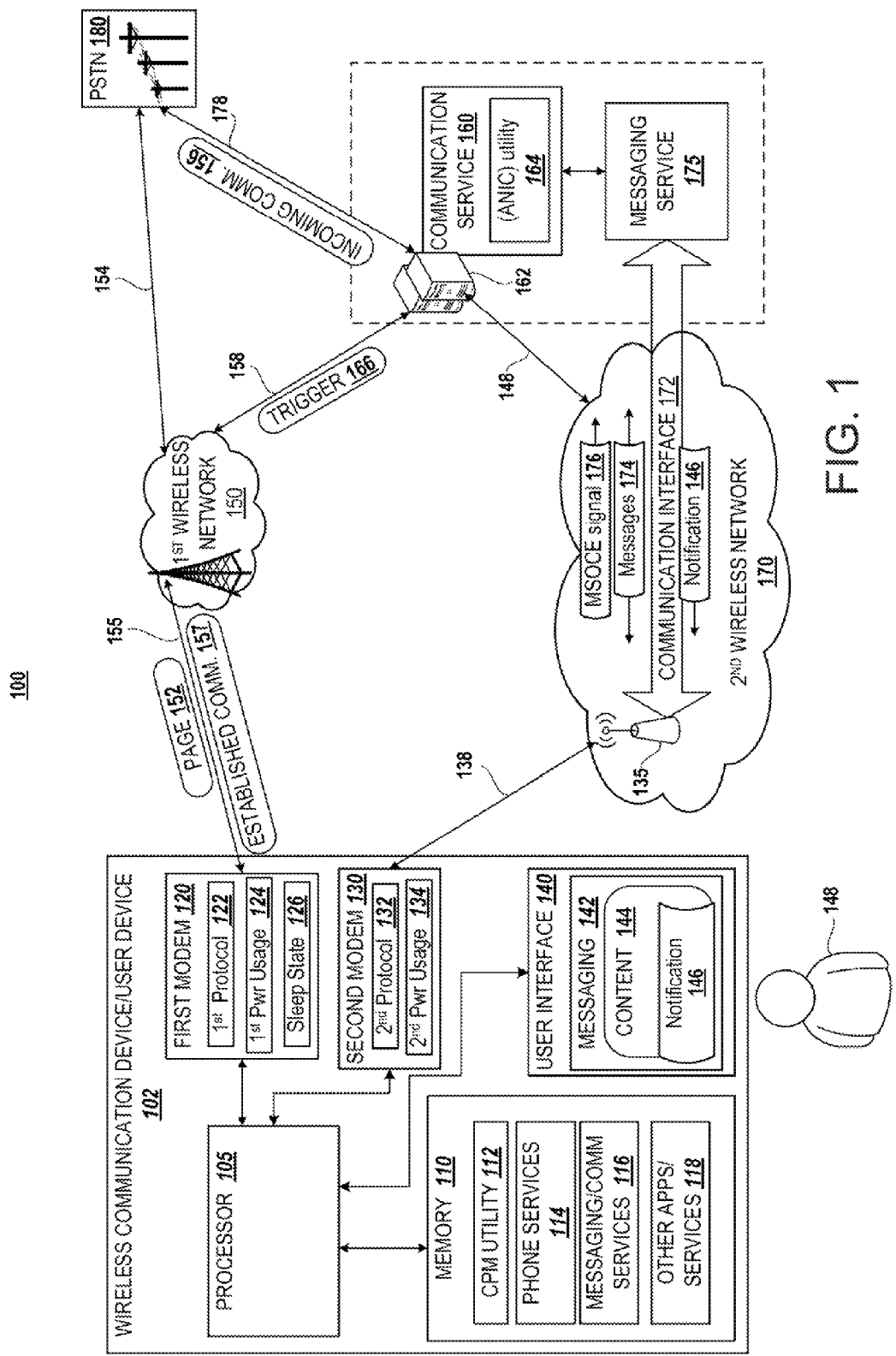
FIG. 1 is a high-level block diagram representation of an example dual network communication environment having functional components of a wireless communication device and communication service that collectively provide the various features and functionality of the disclosure, according to one embodiment.

The illustrative embodiments of the present disclosure provide a wireless communication device and a method performed within a wireless communication device for minimizing power consumption in the device. The device includes at least a first modem and a second modem, each supporting a communication protocol for respectively connecting to at least one communication network, described herein as a first communication network and a second communication network. The method includes the device detecting access to a communication service via the second modem, and in response to that detection: establishing a communication channel between the communication device and the communication service; and placing the first modem in a sleep state when the communication channel is established. The communication service is pre-configured to respond to receipt of an incoming communication that will be routed to the communication device via the first communication network by: (i) automatically transmitting a notification via the second communication network to the second modem; and (ii) forwarding the incoming communication via the first communication network to the first modem. The method then includes, in response to receipt, at the second modem, of the notification of the incoming communication: awakening the first modem to an active state to enable receipt via the first modem of signaling corresponding to the incoming communication.

Also provided as a supporting component of the disclosure is a communication service and a method for routing received communication intended to be transmitted to the communication device over the first communication network. The communication service includes a processor, a first communication interface enabling communication with the first communication network that supports routing of voice calls, and a second communication interface enabling communication with the second communication network. The communication service also includes an advance notification of incoming call (ANIC) utility that executes on the processor and which configures the communication service to: detect when a registered user device associated with a user account is communicatively connected to the communication service; in response to receiving an incoming call for a first phone number assigned to the user account: generate a notification indicating that the incoming call is going to be forwarded to a second phone number associated with the registered user device; transmit the notification to the registered user device over the second communication interface; and forward the incoming call to the second phone number via the first communication interface.

Also disclosed is an alternate embodiment that enables power savings at the wireless communication device (WCD). In the alternate embodiment, a second user device is detected within communicative proximity to the WCD. A method implemented within the WCD includes: receiving information via a client server protocol that indicates that the second user device is actively running a messaging application and is in communication with a communication service that (a) supports the active running of the messaging application and (b) is responsible for routing incoming voice and data communication intended to be communicated to the first user device over the first network; establishing a near field communication channel between a first proximity detection and signaling (PDS) module and the second PDS module to track the proximity of the first user device to the second user device;

in response to establishing the near field communication channel, placing the first modem in a sleep state; and in response to an occurrence of at least one trigger condition, awakening the first modem to an active state to enable use of the first modem to complete communication over the first network.

In the following detailed description, exemplary embodiments in which various aspects of the disclosure may be practiced are described in sufficient detail to enable those skilled in the art to practice the invention. It is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Implementation of the notification and other aspects of the disclosure requires a wireless device user first register and establish an account with a communication service that operates as a call receiving and forwarding service. The communication service is a background service that provides or assigns to the user a public phone number (i.e., a phone number that the user provides as his/her contact phone number) that is linked by the communication service to one or more second phone numbers associated with or assigned to the user's personal communication devices. The communication service is pre-configured to forward incoming calls received on the public phone number to one or more of the second numbers over one or more communication networks. For purposes of the disclosure, the communication networks supporting the call forwarding features includes the first wireless communication network operated by a cellular service provider to which the wireless communication device is subscribed. The public phone number is thus different from and can be independent of the cellular phone number of the user's wireless communication device. However, the user is still able to utilize the wireless device to complete all incoming voice and short messaging service (SMS) or data communications.

As defined herein, the first communication network operates using at least one first wireless protocol that causes the first modem to consume a first amount of power while in a stand-by mode or a scanning-for-network mode. Also, in one embodiment, the second communication network operates using a second wireless protocol that causes the second modem to consume a second amount of power that is less than the first amount of power, while the second modem is in one of (a) active communication with the second communication network, (b) stand-by mode, and (c) a scanning-for-network mode. It is appreciated however, that the amount of power consumed by either modem relative to each other is not dispositive of the determination of whether to turn off one modem or the other, as the turning off of any one of the two modems will result in a net reduction in the amount of consumption of available battery power.

Further, as one example implementation, the first communication network is a cellular network and the second communication network is a WiFi network that is accessed via an access point and can include the Internet. When the WCD is connected to the Internet via a WiFi connection, the WCD registers itself with the server of the communication service, which receives and processes calls placed to the second phone number. The WCD then turns off or places the cellular modem (e.g., 2G/3G/4G modem, etc.) into sleep mode. With the cellular modem turned off or in sleep mode, all active data communication with or by WCD is then conducted over the alternate Internet connection. Then, if a call is received at the phone number associated with the user account at the communication service, the server sends a notification to the WCD over the WiFi connection, which signals to the WCD that there is an incoming call being routed to the first modem. The server also forwards the incoming call to the WCD via the cellular network. The WCD, upon receiving the notification of the incoming call, turns on or wakes up the cellular modem, and the modem then receives the page for the incoming call and selectively connects the incoming call.

Possible examples of the communication service can include Google Voice™, Google Talk®, Vonage®, Skype®, which are all accessible over an Internet connection. With one or more of these implementations, for example, the following, non-exclusive list of implementation characteristics can be applied:

(i) modifying the user device to enter into a sleep operating mode in which the device either does not monitor cellular page messages at all or monitors cellular page messages very infrequently. For example, the wireless communication device would normally monitor CDMA pages every 1.28 seconds while in standard operating mode, and the device may monitor CDMA pages only every 30 seconds or longer while in the sleep operating mode. Thus, the wireless communication device does need to maintain as much synchronization to the cellular signal to be able to quickly revert back to a state where the device can receive a page; and (ii) the wireless communication device remains registered to the cellular network in this sleep operating mode until the communication channel with the communication service over the Internet (or other second communication network) is lost or broken. Thus, the WCD does not completely deregister from the cellular network, to allow for receipt of pages, but immediately exits the sleep operating mode and resumes standard operation as soon as the connection is broken or a notification of an incoming page is received at the second modem.

Turning now to FIG. 1, there is depicted a block diagram representation of a wireless communication environment 100, which includes a wireless communication device (WCD) 102 and other functional components or devices, interconnected via communication networks and providing additional services that collectively support and/or enable several of the features of the disclosure. Among these communication networks within wireless communication environment 100 are first wireless network 150, second wireless network 170, and public switch telephone network (PSTN) 180. Within the description, first wireless network 150 can be described as a cellular wireless network, which includes base stations and other cellular network infrastructure. The actual number of communication networks within communication environment 100 can be a larger number of networks than illustrated. First wireless network 150 can be representative of a plurality of different wireless communication networks that support the various different wireless communication technologies, such as LTE 4G, 3G, CDMA, and other wireless communication technologies. Additionally, within the description, second wireless network 170 includes a wireless fidelity (WiFi) network, which includes at least one wireless access point 135 that allows WCD 102 to register with the WIFI network and connect to different backend services. It is appreciated that while the descriptions are presented and illustrated using specific types of wireless networks as the first wireless network and second wireless network, the underlying concepts of the disclosure are fully applicable to user devices and communication environments where the first and second networks are similar networks (e.g., both cellular networks) or the first and second networks are different types of networks from those provided within the examples provided and/or described herein.

Among the other functional components or devices within wireless communication environment 100 are communication service 160 and messaging service 175. While shown as separate blocks within wireless communication environment 100, in at least one embodiment, messaging service 175 can be included as one of multiple services provided within communication service 160. Communication service 160 and messaging service 175 are provided on one or more servers 162 which are communicatively connected to one or more wireless communication networks and to PSTN 180 (as shown by the various bi-directional arrows 138, 148, 154, 158, and 178) and are thus network-accessible from WCD 102.

Wireless communication device 102 generally includes a first wireless modem 120 that enables the wireless communication device (WCD) 102 to interface with a first wireless network 150 and perform wireless communication exchange via a first communication channel 154. As shown, wireless communication device 102 generally includes a second wireless modem 130 that enables the WCD 102 to interface with a second wireless network 170 and perform wireless communication exchange via a second communication channel 138. First wireless modem 120 is shown having or supporting specific functional characteristics including first wireless protocol 122, first power usage characteristics 124, and a sleep state 126. Second modem 130 is shown with functional characteristics that include a second wireless protocol 132 and second power usage characteristics 134.

Wireless communication device 102 also includes at least one processor 105 coupled to the first wireless modem 120 and the second wireless modem 130. Additionally, as further shown by FIG. 1, WCD 102 also includes memory 110, which is coupled to processor 105. Illustrated within memory 110 are software or firmware components, including a communication and power management (CPM) utility 112, phone services utility 114, messaging and/or communication services utility 116 (e.g., SMS utility), and other applications and/or services 118. These software components, and in particular CPM utility 112 and messaging/communication services utility 116 execute on processor 105 to configure the WCD 102 to perform the one or more of the user device features described herein. More specific configuration details of WCD 102 are presented within FIG. 2, which is described following the description of FIG. 1.

During operation of the WCD 102, CPM utility 112 executes on the processor 105 and configures the WCD 102 to: in response to the second wireless modem 130 being communicatively connected to the second wireless network 170: establish, via the second wireless modem 130, communication with communication service 160, which is accessible over the second wireless network 170; and set the first wireless modem 120 to a sleep state 126. As described herein, the communication service 160 implements (i) routing of a signal (i.e., page 152) that is indicative of an incoming communication 156 over the first wireless network 150 to the WCD 102 and (ii) exchange of messages 174 with and forwarding of notification 146 to the WCD 102 over the second wireless network 170. The CPM utility 112 further configures the WCD 102 to, in response to receipt of a notification 146 from the communication service 160, at the second wireless modem 130, which identifies that the incoming communication 156 is being forwarded to the WCD 102 via the first wireless network 150: return the first wireless modem 120 to an active state (from the sleep state) to enable connection establishment (i.e., established communication 157) for the incoming communication 156 to the WCD 102. The established communication 157 is routed through the first wireless modem 120 following receipt of the signal (page 152) of the incoming communication 156. Additionally, the CPM utility 112 further configures the WCD 102 to initiate a monitoring protocol at the second modem 130 to detect receipt of the notification 146 in response to establishing a communication channel between the wireless communication device 102 and the communication service 160. In one embodiment, the processes described herein are implemented by a CPM module (not shown), which can be a separate physical component (e.g., a depicted processor, microcontroller, or hard wired logic) within WCD 102 that executes similar processes as those described as being provided by execution of CPM utility 112 by processor 105.

According to one or more embodiments, the CPM utility 112 transitioning the first wireless modem to a sleep state includes the CPM utility configuring the WCD 102 to perform at least one of: (a) turn off power to the first wireless modem, (b) remove power from one or more power consuming components of the first wireless modem, (c) turn off specific power consuming components of the first wireless modem, (d) intermittently provide power to a subset of components of the first wireless modem that are required to periodically transmit registration parameters to the first wireless network and exchange timing data with a network tower for uplink and downlink communication, (e) place the first wireless modem in a low power state in which the first wireless modem consumes a limited amount of power but retains operational readiness to enable a quick response to receipt of the incoming wireless communication, and (f) place the first wireless modem in an operating mode in which the first wireless modem monitors a signal of the first wireless network less frequently than when the first wireless modem is in an active operating mode.

As one component of transitioning to a sleep state or sleep operating mode, the WCD 102 has to remain registered on the cellular network (150) even when in the sleep state. In order to achieve this un-interrupted registration, the WCD 102 performs the following functions: (1) transmits periodic registrations with the cellular network; and (2) updates broadcast system information if the information has changed; and continues updating measurements of cells of the cellular network to enable (a) quick selection of cells, if necessary, and (b) resynchronization when the cellular modem is reawakened. The frequency of updating cell measurements is significantly reduced while the WCD 102 is in the sleep state.

Additionally, the WCD 102 must also be reconfigured to enable proper handling of operator-initiated messages. For example, while the user device is able to receive calls and messages sent to the public phone number associated with the user account, direct messages and calls originated within the cellular service operators' network may not be received by the device, as the user device would not receive an incoming call notification for such network-originating messages and calls. Thus, in one embodiment, the placing of the device in the sleep state also triggers generation of a message notifying the network to hold off transferring any network originating SMS until the device modem transmits a registration message indicating the modem is fully active. Thus, a "hold messages" mode can be supported by the operator network by which the WCD 102 is able to send the notification message to the network requesting all messages to be held until a subsequent registration message is transmitted.

The functionality described herein can also be utilized to reduce power consumption when the WCD 102 is configured to allow multiple cellular radio access technologies (RATs) be simultaneously active. According to one specific embodiment, the second modem can be an LTE/1x device. Then, when the LTE/1x device is in LTE coverage, the WCD 102 registers itself with the server(s) 162 and conducts all data activity over the LTE connection. The WCD 102 can also enter into a special mode for 1xRTT where the WCD 102 performs a significant number of activities related to 1xRTT less frequently (e.g., paging monitoring, measurements, cell selection/reselection). If a call is received for forwarding to the second phone number by the server 162, the WCD 102 receives an incoming call notification sent by the server 162 over the LTE connection, and the WCD 102 reverts to the normal 1xRTT operation. The specific protocols and supporting devices that are provided with this embodiment can be LTE/3G and LTE/2G protocols and devices.

As introduced above, WCD 102 also includes a messaging application (116) that includes a messaging service connection utility that executes on the processor 105 and configures the WCD 102 to: transmit a messaging service online connection established (MSOCE) signal 176, via the second wireless modem 130 over the second wireless network 170, to a server 162 of the messaging service 175. On detection by the messaging service 175 of the MSOCE signal 176, messaging service 175 identifies WCD 102 as being "online" (i.e., communication channel established) and provides an "online notification" message to the associated communication service 160. The receipt of this online notification can then cause communication service 160 to configure its incoming signal response protocol to include issuance of the notification 146 to WCD 102 prior to or concurrently with forwarding a signal or page 152 of the incoming communication 156 via the first wireless network 150.

Creation of messages for exchange with messaging service 175 can be performed using user interface 140 of WCD 102. As indicated, user interface 140 can include or provide a messaging interface 142, which provides messaging content 144. In at least one embodiment, messaging interface 142 can also provide a visual indication of a received notification 146 to alert the user 148 of an incoming communication to the first modem 120.

Figure 2:
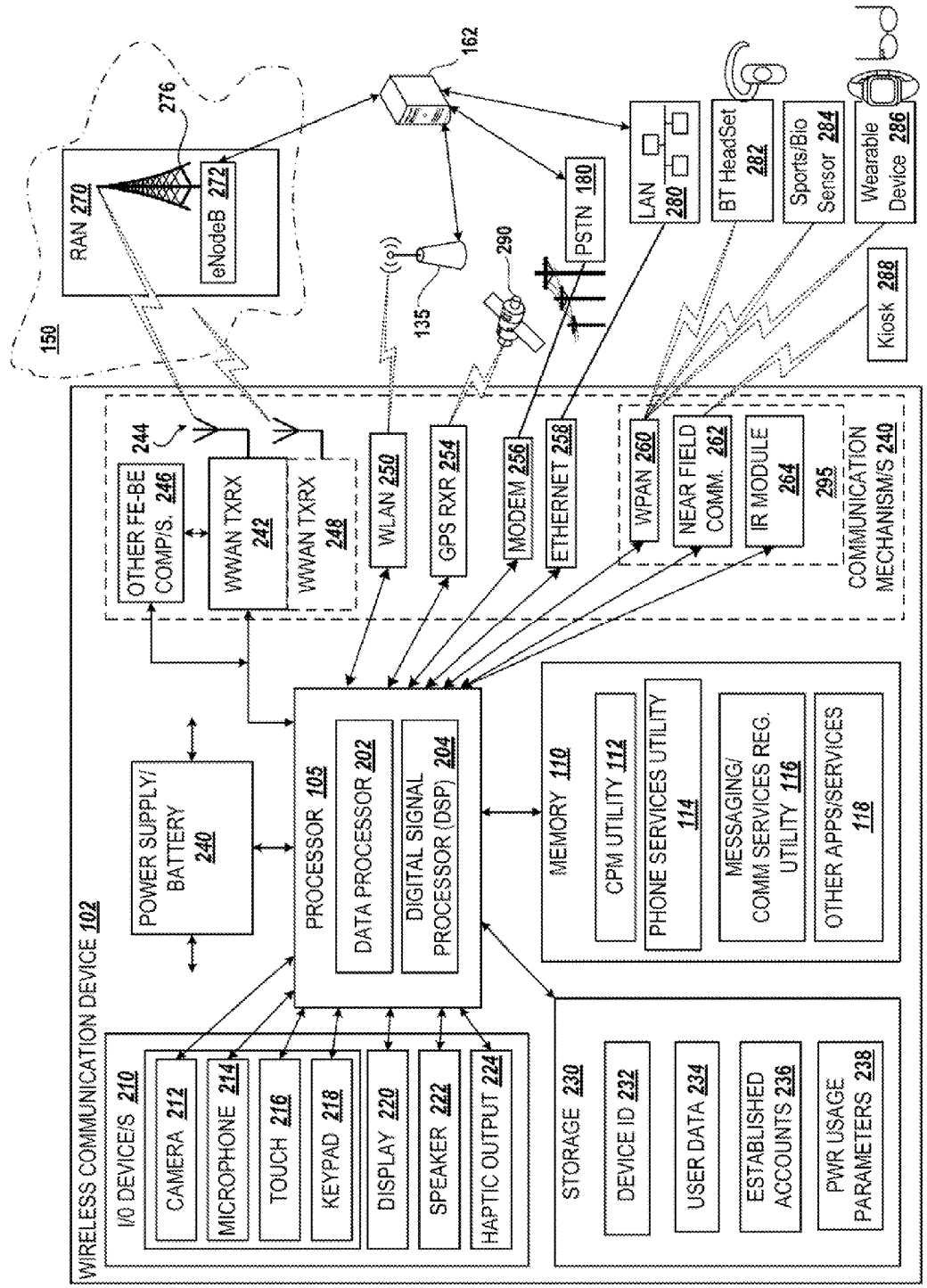
FIG. 2 is a block diagram representation of an example wireless communication device that supports operation within a multi-network communication environment and within which several of the features of the disclosure can be advantageously implemented, in accordance with one or more embodiments.

FIG. 2 provides a more detailed illustration of a wireless communication device that is capable of supporting multiple different forms of communication using several different technologies, according to a plurality of alternate embodiments. WCD 102 can be one of a host of different types of user communication devices, including but not limited to, a mobile cellular phone or smart-phone, a desktop computer, a laptop, a net-book, an ultra-book, and/or a tablet computing device. The various devices provide and/or include the necessary hardware and software to support the various wireless or wired communication functions as part of a communication environment. In the description of FIG. 2, similar elements are provided the same reference numeral as FIG. 1 and those elements which have been previously described in FIG. 1 may be omitted from or only summarily referenced within the description of FIG. 2.

WCD 102 includes an integrated circuit (IC) processor 105, which connects via a plurality of bus interconnects (illustrated by the bi-directional arrows) to a plurality of functional components of WCD 102. Processor 105 can include one or more programmable microprocessors, such as a data processor 202 and a digital signal processor (DSP) 204, which, in some embodiments, may both be integrated into a single processing device. Processor 105 controls the communication, application data processing and signal processing, user interfacing, and other functions and/or operations of communication device 102. Connected to processor 105 is memory 110, which can include volatile memory and/or non-volatile memory.

As presented in the description of FIG. 1, one or more executable applications or programmed utilities can be stored within memory 110 for execution by data processor 202 or in some signal processing scenarios by DSP 204. For example, memory 110 is illustrated as containing CPM utility 112, phone services utility 114, messaging utility 116, and other applications and/or services 118. In at least one alternate embodiment, one or more of the utilities illustrated within memory can exist as firmware in other locations within WCD 102 and be utilized for controlling the operations of or execution by other controllers or specialized or dedicated processors within WCD 102. The associated functionality and/or usage of each of the software modules will be described in greater detail within the descriptions which follow. In particular, the functionality associated with CPM utility 112 and messaging utility 116 are described in greater detail with the description of FIG. 4.

WCD 102 includes a plurality of input/output (I/O) devices 210 that operate as user interface devices. These I/O devices 210 can include one or more input devices, such as camera 212, microphone 214, touch screen and/or touch pad 216, and keypad 218. The I/O devices 210 can also include one or more output devices, such as display 220, speaker 222, and haptic output device 224. The input devices can be utilized to access applications on the WCD 102, such as messaging utility 116, and enter information relative to that executing application. Thus messages generated for exchange with a messaging service 175 (FIG. 1) can be entered using the input devices. Similarly, the output devices can permit feedback during these interactions with the executing application. Thus, in the example of message exchange involving the messaging utility 116, messages 144 and notification(s) 146 (see FIG. 1) can be presented on the display 220 or outputted via speaker 222 or haptic output device 224 based on a setting of the WCD 102 and/or of the messaging utility 116. Thus, as one example, receipt of the advanced notification 146 (FIG. 1) of the incoming call on the first wireless network 150 can also trigger haptic output device 224 to cause the WCD 102 to vibrate.

WCD 102 also includes storage 230 that stores one or more data utilized during operation of WCD 102. Storage device 230 is also coupled to processor 105 and can be any type of available storage device that is integral, attachable or insertable and capable of storing one or more application software and data. It is further appreciated that in one or more alternate embodiments, storage 230 can actually be remote storage and not an integral part of the WCD 102 itself. Among the stored data are device identifier 232, user data 234, established accounts 236, and power usage parameters 238. Device identifier 232 can consist of a phone number that is assigned to WCD 102 by a wireless service provider. Device identifier 232 can also include or consist of a unique set of characters that is not a phone number, but which is uniquely assigned to WCD 102 by a manufacturer or an external service. User data 234 includes information about the user 148 (FIG. 1) of WCD 102. Established accounts 236 can include account identifiers and login information for various services to which the user 148 and/or WCD 102 have been registered, such as messaging service 175 or communication service 160 (FIG. 1), for example. Power usage parameters 238 can include information for tracking the power usage by one or more components within WCD 102. In one or more embodiments, power usage parameters 238 can be utilized in determining how and when to place communication components, such as a first modem, in a sleep or inactive or low power state, as described herein. The power usage parameters 238 track consumption of power from power supply (battery) 240. Battery 240 is electrically coupled to and provides electrical power to each power consuming component in order to enable operation of the various components of WCD 102. Additional usage and/or functionality associated with one or more of these components are provided throughout the disclosure.

To support wireless communication, WCD 102 can include two or more of the illustrated components within communication mechanism(s) 240. Communication mechanism(s) 240 includes first wireless wide area network (WWAN) transceiver 242 with connected antenna 244, which enables WCD 102 to communicate with a radio access network (RAN) 270 of a cellular network, which will be referenced herein as first wireless network 150 for continuity with the FIG. 1 description. For simplicity, one connected antenna 244 of WWAN transceiver 242 is depicted. However, WWAN transceiver 242 may be associated with more than one antenna 244, each antenna having one or more selected bandwidths of operation to support different modes of communication or for simultaneous communication in different communication technologies. Alternatively, as provided by the dashed outline box, WCD 102 can optionally include a second WWAN transceiver 248, having similar functional usage as first WWAN transceiver 242 but supporting communication with a different RAN and/or via a different wireless technology. Hybrid schemes of transceivers are provided in some designs of wireless communication devices. It is appreciated that with devices configured with these hybrid schemes, any one or both of the transceivers can be toggled between a sleep state and an active state. Further, one of the two transceivers can operate as the second modem in the described embodiments, with the other operating as the first modem. Also, WWAN transceiver 242 is communicatively coupled to or integrated with additional front-end and back-end components 246, which can provide the required support for the toggling of WWAN transceiver 242, operating as the first wireless modem, between a sleep state and an active state as well as implement the periodic "alive" checks and reporting-in functions described herein. RAN 270 is generally represented as including a base station, depicted as an evolved base node ("eNodeB") 272 that transmits and receives communication signals over a base station antenna 276.

In addition to WWAN transceiver 242 and associated components, WCD 102 can include a wireless local area network (WLAN) module 250 to communicate with wireless networks accessible via wireless access point 135. As an example, the WLAN module 250 may support IEEE 802.11 standards with the access point 135 operating as a WiFi hotspot. Alternatively or in addition, wireless communication device 102 can also include components for wired communication, such as modem 256 for communicating over a public switched telephone network (PSTN) 180 and Ethernet module 258 for connecting to a local area network (LAN) 280. WCD 102 can also include a global positioning system (GPS) receiver (RXR) 254, which can receive signals from GPS satellite 290 in order to provide location information. This location information can be utilized in one embodiment to determine that the current location of the WCD 102 is a location in which the implementation of the features described herein will provide benefits of reducing device power consumption due to weak cellular signals, for example.

As further illustrated, WCD 102 can include one or more close range wireless communication technologies 295, including a wireless personal access network (WPAN) transceiver 252 for communication with WPAN devices, depicted as a Bluetooth® headset 282, a sports/biometric/physiological sensor 284, and a wearable device 286 (such as multi-function watch, heads up display, etc.). WPAN can include technologies such as Infrared Data Association (IrDA) standard, Wireless Universal Serial Bus (USB), Bluetooth®, Z-Wave, ZigBee, Body Area Network, and ANT+. Alternatively or in addition, the close range wireless communication technologies 295 of WCD 102 can include a near field communication (NFC) transceiver module 262, such as can be utilized for exchanging files with another user device or a payment kiosk 288.

Figure 3:
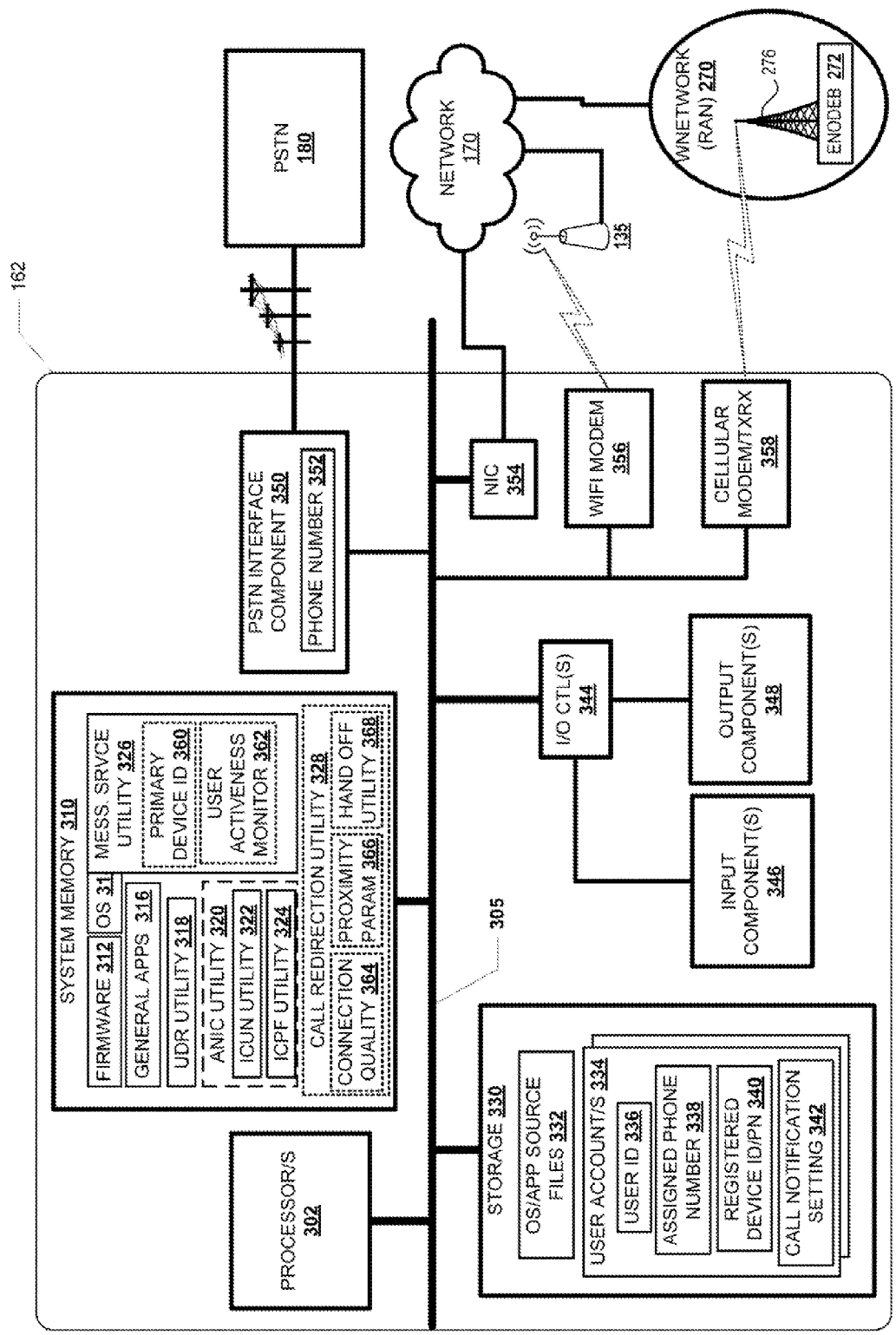
FIG. 3 is a block diagram representation of network server on which a communication service is provided to implement the server-side features and/or functions of the disclosure, in accordance with one embodiment.

Referring now to FIG. 3, there is illustrated a block diagram representation of an example server 162 which is configured as or configured to provide the functional features of a communication service 160 and possibly the functional features of messaging service 175 (FIG. 1). It is appreciated that the actual server providing communication service 160 can in fact be a large scale system comprising a large number of server computers and that these server computers can be distributed across multiple locations. It is further appreciated that the server providing the messaging service 175 can be a different computing device or set of computing devices from that providing the communication service 160. The presentation herein of a single device providing the two different services is for simplicity only and presents only one possible implementation of the physical configuration. Also, when the two services are provided by different, physical computing systems, the physical component makeup of the two servers will likely include those components described in FIG. 3, with the contents of the memory and/or storage being tailored to the implementation of the specific service.

Server 162 includes one or more processor(s) 302 which is coupled via a system bus 305 to system memory 310 and storage 330. Included within system memory 310 are functional software components, including firmware (FW) 312, operating system (OS) 314, general applications 316, user and device registration (UDR) utility 318, advance notification of incoming call (ANIC) utility 320, and messaging service utility 326. ANIC utility 320 can include incoming-call user notification (ICUN) utility 322 and incoming call paging and forwarding (ICPF) utility 324, in one embodiment. Storage 330 includes software code or source files 332 for the various utilities and applications illustrated within system memory 310. Storage 330 also includes data that is utilized and/or generated by the various utilities. Among the data are user accounts 334, which each include a user account ID (userID) 336, an assigned phone number 338, and one or more registered phone device IDs 340. Also included with each user account is an incoming call notification (ICN) parameter setting 342, which indicates when the registered user device and/or the user account has been established within communication service to receive notifications over the second communication channel when an incoming call is received for the assigned phone number 338. More importantly, the notification indicates that the received call is being forwarded to the user device over the first wireless network. In one embodiment, this parameter has one of two settings, on or off. Accordingly, the user account can be set to an on setting in response to the WCD 102 establishing a connection to messaging service 175, which in turn triggers communication service 160 to set the call notification parameter setting 342 to on. In an alternate embodiment, the call notification parameter setting 342 can be set to always be "on" by default unless expressly turned "off" by the user. In a related embodiment, no express setting is required, and the communication service firmware is updated to automatically trigger the notification functionality for all received incoming calls without having to first check whether the WCD 102 is connected to the messaging service 175.

To enable programming and interfacing with server 162, server 162 can also include one or more input component(s) 346 and one or more output component(s) 348, which are coupled to system bus 305 via one or more I/O controller(s) 344. Server 162 also includes several different components that enable server 162 to establish communication and/or to communicate with various external communication networks and thus with WCD 102. For example, server 162 includes PSTN interface component 350 that allows server 162 to receive incoming calls originating over a PSTN 180. To support PSTN communication, an assigned phone number 338 is provided for each separate user account. Server 162 also includes network interface component (NIC) 354, WIFI modem 356, and cellular modem (or transceiver/receiver) 358. NIC 354 enables wired connection to one or more networks, generally represented by network 170. WiFi modem 356 enables wireless connection to network 170 via one or more access points 135. Cellular modem 358 enables server 162 to connect to a base station within a wireless network, such as RAN 270. As previously introduced, RAN 270 includes eNodeB 272 and antenna 276.

Referring to the previously introduced figures and according to one aspect of the disclosure, the above combination of hardware and software components provides a communication service 160 (or server 160) that includes: a processor 302; and a first communication interface (e.g., 358) enabling communication with a first communication network (e.g., 270) that supports routing of voice calls; and a second communication interface (e.g., 354 or 356) enabling communication with a second communication network (e.g., 170). The communication service 160 further includes an ANIC utility 320 that executes on the processor(s) 302 and which configures the components of the communication service 160 to: detect when a registered user device (e.g., WCD 102) associated with a user account (e.g., 334) is communicatively connected to the communication service. The ANIC utility 320 further configures the communication service 160 to: in response to receiving an incoming call (see FIG. 1) for a first phone number (i.e., assigned phone number 338) assigned to the user account(s) 334: generate a notification 146 indicating that the incoming call is going to be forwarded to a second phone number (340) associated with the registered user device (102); transmit the notification 146 to the registered user device (102) over the second communication interface (e.g., 170); and forward the incoming call to the second phone number (340) via the first communication interface (e.g., 358). Optionally, in one embodiment, the generation and transmitting of the notification can be conditioned to occur only while the registered user device (102) is communicatively connected to the communication service 160.

Additionally, the ANIC utility 320 forwarding the incoming call to the second phone number (340) also comprises configuring the communication service 160 to: signal the first wireless communication network (150) to transmit a page (152) to the second phone number (340); and in response to the registered user device (102) accepting the page 152, forward the incoming call 156. The ANIC utility 320 further configures the communication service 160 to: receive an input of registration information that sets an ANIC feature to "on" within the user account. The registration information triggers the communication service 160 to issue the notification via the second communication interface prior to or concurrent with transmitting a page (152) and forwarding the incoming communication request via the first communication interface (172). In one embodiment, the setting of the ANIC feature to "on" occurs in real time in response to successful establishment of a communication channel between the WCD 102 and the communication service 160.

Implementation of the notification features of the disclosure requires a set-up or pre-registration of the WCD 102 as well as the associated user with the communication service 160. Thus, according to at least one embodiment, the user accesses the communication service 160, either through the WCD 102 or some other means (e.g., using a personal computer). The communication service 160 further includes communication service firmware that: associates the device ID 340 of the user device with a single registered contact number that is different from a second number assigned to the user device for use to route communication within the first communication network. The communication service 160 further: maintains communication with the WCD 102 through the second wireless modem 130 after the WCD 102 establishes the communication channel with the messaging service 175; and in response to receiving an incoming communication that will be routed to the WCD 102 via the first wireless network (150), (i) automatically transmits the notification 146 of the incoming communication to the WCD 102 via the second wireless network 170 and (ii) forwards the incoming communication to the WCD 102 via the first wireless network 150.

Figure 4:
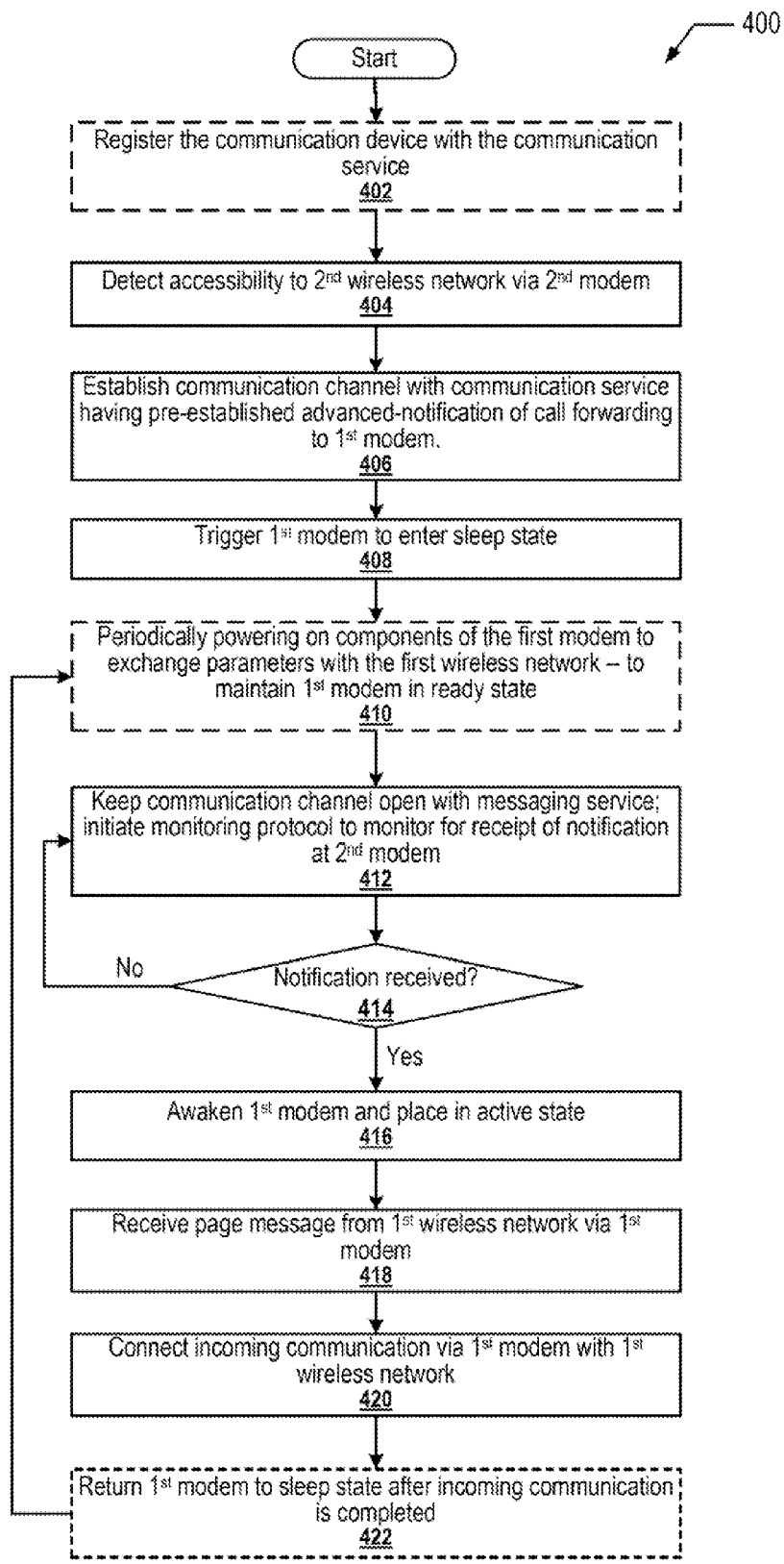
FIG. 4 is a flow chart illustrating various aspects of the method by which the communication device implements the user device-side functions of the disclosure, according to one or more embodiments.
Figure 5:
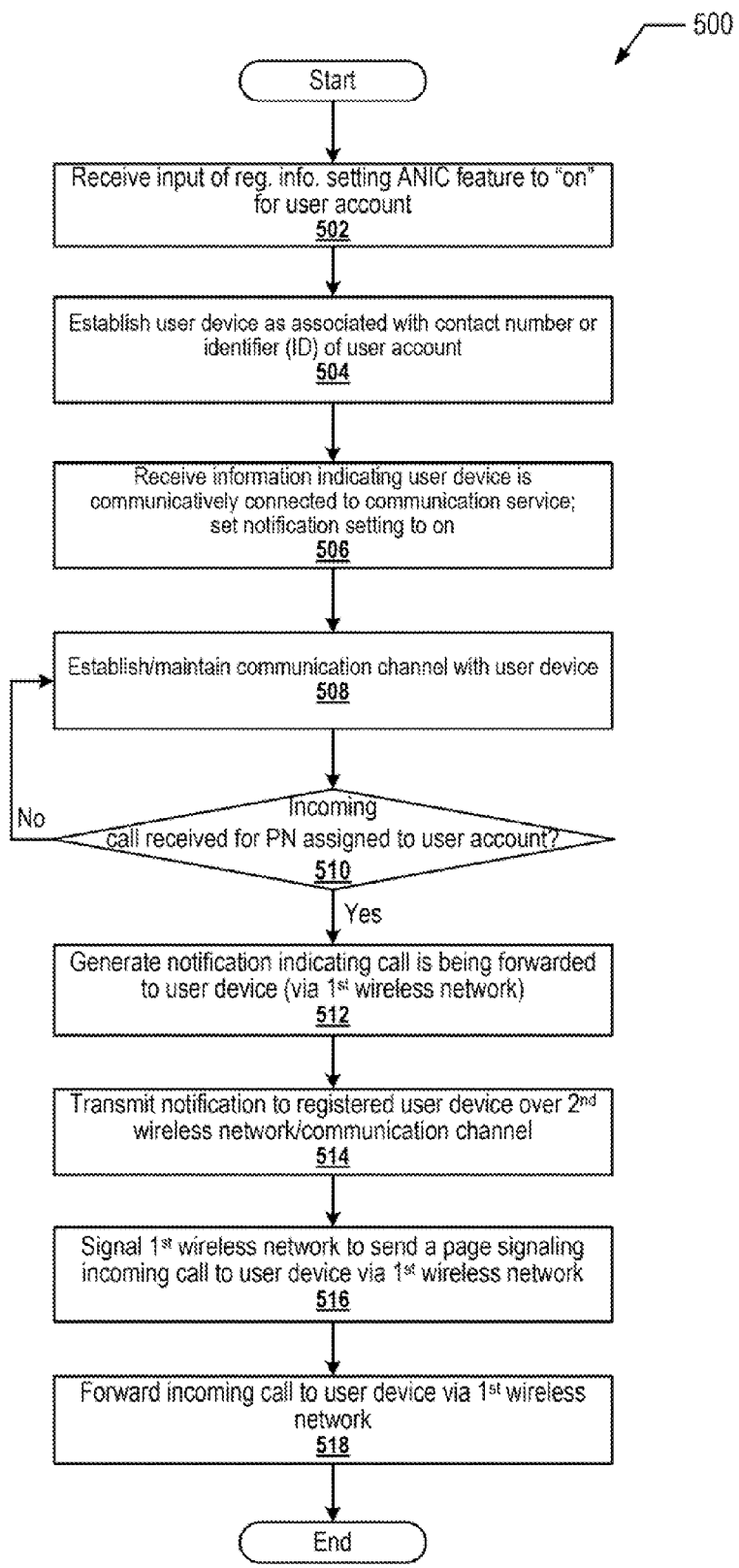
FIG. 5 is a flow chart illustrating various aspects of the method by which the communication service implements the server-side functions of the disclosure, according to one or more embodiments.

The following description of the flow charts of FIGS. 4 and 5 are presented with continuing reference to FIGS. 1, 2, and 3. Generally, FIG. 4 provides aspects of the method 400 by which the WCD 102 executes the various utilities described in FIG. 2 to minimize power consumption by WCD 102 when there are multiple modems and communication networks available, as presented within communication environment 100 of FIG. 1. Specifically, method 400 minimizes or reduces power consumption in a communication device that includes at least a first modem and a second modem, each supporting a communication protocol for respectively connecting to at least one communication network. FIG. 5 then provides aspects of the method 500 by which the processor(s) 302 of server(s) 162 that provides communication service 160 executes the various utilities presented in FIG. 3 to enable the advanced notification of an incoming communication, as described herein. Specifically, method 500 presents processes involved in forwarding calls or other communications received by a network-accessible communication service and providing advanced notification of the forwarding of the incoming communications to corresponding user devices.

Figure 6:
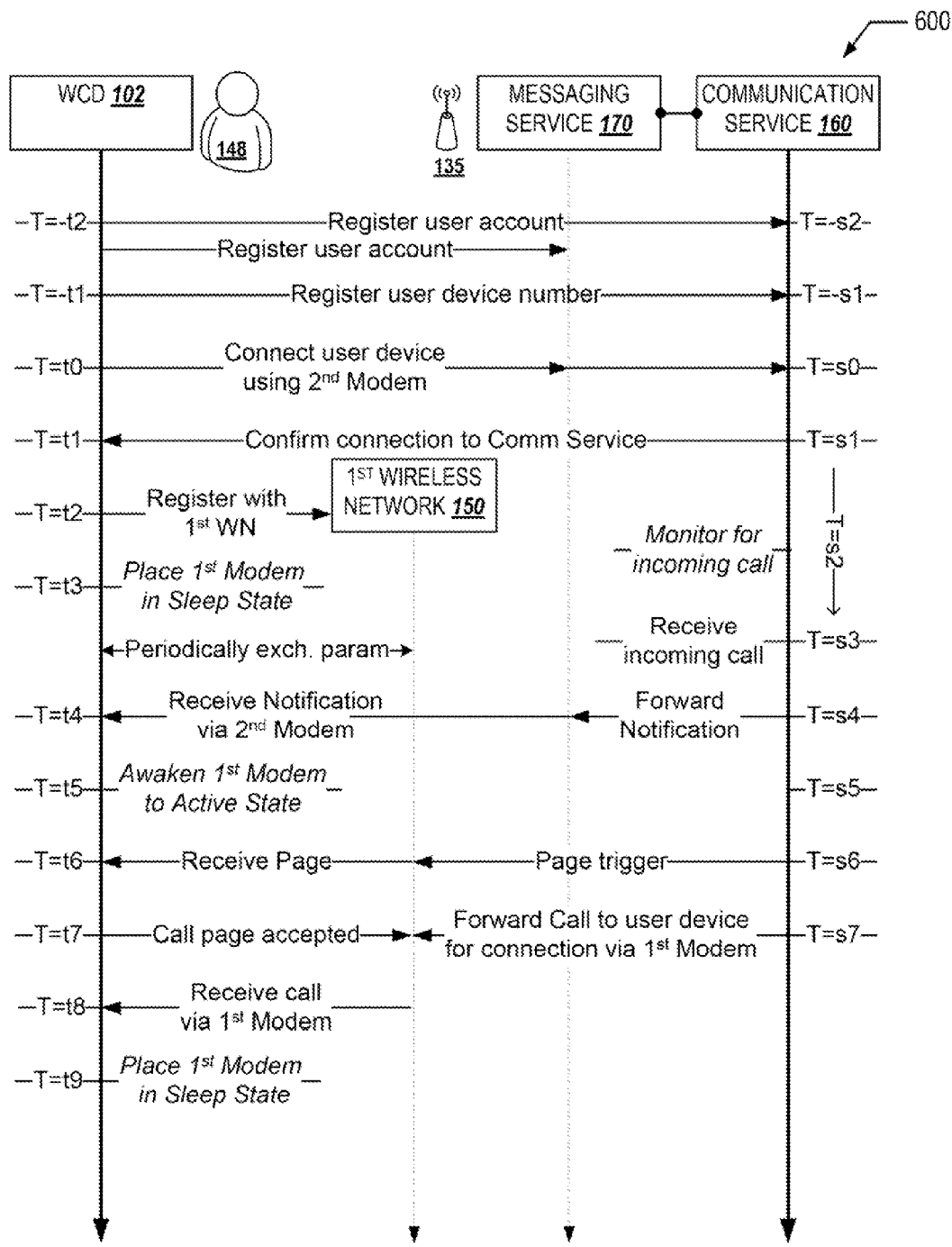
FIG. 6 illustrates an example timing diagram showing dispatch of communications between the communication device and server via different communication networks, in accordance with one or more embodiments.

The descriptions of FIGS. 4 and 5 are also provided with reference to the timing diagram 600 of FIG. 6. Generally, the timing diagram 600 tracks the processes that occur at WCD 102 as well as the processes that occur at wireless communication service 160 and a limited number of the processes occurring at or through first wireless network 150. The time scale is presented in the vertical downwards direction extending along vertical arrows that connect to the specific component that performs or is involved in a particular process. Each communicative process is illustrated with text along a horizontal arrow showing a communication from one device to another. However, where a process is internal to a single device, that process is indicated via italicized text with no arrows on the horizontal line. It should be noted that the spacing and naming of the specific times are for illustration only and do not represent any particular length of time or relative time between specific ones of the processes. Times of processes occurring at or involving the WCD 102 are presented with small "t", while those involving the communication service 160 are illustrated with small "s".

Referring to FIG. 4, method 400 begins at start block and proceeds to block 402 at which the communication device is initially registered with the communication service. This process is illustrated in a dashed box as the registration is one that would necessarily precede the actual implementation of the other features presented within the disclosure. This registration process along with the actual setup of the user account are shown to occur at times −t1 and −t2 respectively, in FIG. 6, as both processes occur prior to the implementation of the novel features of the disclosure. Method 400 thus provides registering the communication device with the communication service, where the communication service associates the communication device with a first identifier assigned to a registered account at the communication service of a user of the first device. According to one or more embodiments, registering the communication device further includes transmitting registration information, via the second modem, to a server of the communication service, where the receipt of the registration information causes the communication service to configure the user account to allow transmission of the notification when the communication service is forwarding an incoming communication to the WCD over the first communication network. In the described embodiments, the incoming communication is a phone call and the first identifier includes a phone number utilized for receiving the incoming call at the communication service.

Following this initial registration, during device operation, method 400 includes the WCD detecting the presence of a second wireless network that is accessible via the second modem (block 404), and in response to detecting communicative access to one of a messaging service 175 and a communication service 160 via the second modem: establishing a communication channel with the communication service 160, which is pre-configured to provide advanced notification of forwarding or routing of an incoming call to the first modem (block 406). This establishing process occurs at time T=t0 on the WCD 102 timeline. Then, following establishment of the communication channel, method 400 includes triggering the first modem to enter a sleep state (step 408). The various possible implementations of the sleep state have been previously introduced in the description of FIG. 1. These two processes are completed at times T=t1 and t2, respectively, on the timeline, with the first involving a communication with the first wireless network 150, while the second is an internal process performed within WCD 102 independently. Then, method 400 further includes periodically placing the first modem in an active state in order to exchange parameters with the first communication network that are required to maintain the first modem in a ready state for quickly establishing a communication channel with the first communication network (block 410). This function is indicated as being optional as the periodic exchange of parameters is only required when the first modem and communication network are associated with a cellular wireless network. The process occurs at time T=t3 on the timeline.

In response to establishing the communication channel with the communication service 160, method 400 further includes initiating a monitoring protocol at the second modem to detect receipt of the notification (block 412). Method 400 then includes, determining or detecting at decision block 414 whether a notification is received at the second modem. The monitoring function continues until an incoming call notification is received or the user performs an action on WCD 102 that causes the first modem to enter the active state. However, in response to receipt, at the second modem, of the notification (at time T=t4), method 400 includes awakening the first modem to an active state (at time T=t5) to enable receipt of signaling corresponding to the incoming communication via the first modem (block 416). Method 400 then includes, subsequent to the awakening of the first modem, receiving, at the first modem, a page from the first communication network addressed to a first identifier associated with the communication device, where the page is associated with a forwarding of the incoming communication by the first wireless service (block 418). The page is received at time T=t6. Then, method 400 includes, subsequent to receiving the signaling corresponding to the incoming communication, accepting the page at time T=t7 and then receiving and connecting the incoming communication, via the first modem, with the first wireless network (block 420). Method 400 then incudes returning the first modem to the sleep state after the incoming communication is terminated (block 422) and returning to block 410. In an alternate implementation (not shown), method 400 can transition from block 420 back to block 404, and the device re-confirms the established communication channel before placing the first modem back into the sleep state. The connection of the incoming communication occurs at time T=t8, and the process of returning to the sleep state occurs at time T=t9.

Referring now to FIG. 5, method 500 begins at start block and proceeds to block 502 at which method 500 includes receiving an input of registration information that sets an ANIC feature to "on" within the user account. The registration information triggers the communication service 160 to issue the notification via the second communication interface prior to or concurrent with forwarding an incoming communication request over the first communication interface. Method 500 includes registering the user device with a single registered contact number or user account identifier (block 504). It is understood that the single registered contact number can be different from an assigned second number of the user device (e.g., the phone number that is assigned by the service provider) and is the public access number provided for the WCD 102. These registration processes occur prior to the initial features of the disclosure and are show in FIG. 6 as occurring at times T=−s2 and T=−s1. Method 500 then includes the communication service 160 establishing (at T=s0 and T=s1, corresponding to T=t0 and T=t1) a first communication channel via a second communication network with a registered user device associated with a user account (block 506). This process can include associating the user device with a user account at the communication service 160. Once the device is associated with the corresponding user account, method 500 includes establishing and maintaining an open communication channel with the user device via the second communication interface (block 508) until the channel is terminated by the user device or loss of a connection with the user device occurs. This period is represented as the time elapsed between T=s1 and T=s3, which is represented in the timing diagram as the vertically extending T=s2. At decision block 510, method 500 includes determining whether an incoming communication is received for the phone number assigned to the user account. Then, in response to receiving an incoming call for a phone number assigned to the user account (at time T=s3), method 500 includes generating a notification indicating that the incoming call is going to be forwarded to a second phone number associated with the registered user device via a first communication network (block 512). In at least one embodiment, this generation of the notification occurs only when the registered user device is communicatively connected to the communication service 160. Method 500 then includes transmitting (at T=s4) the notification to the registered user device over the second communication network (block 514). Concurrently with or contemporaneously with the generation and transmission of the notification, method 500 includes signaling the first communication network to send a page to the second phone number over the first communication network (block 516). The signaling is indicated as a page trigger that is sent to the first wireless network at time T=s6. The page is sent to the WCD 102 from the first wireless network and received at time T=t6. The page is accepted and radio connection establishment is performed at T=t7. Method 500 finally includes forwarding (at time T=s7) the incoming call to the second phone number via the first communication network (block 518). In response to the WCD 102 accepting the page, the first wireless service connects the incoming call to the first modem, at time T=t8.

In the flow charts of FIGS. 4 and 5 presented herein, certain processes of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

An example scenario in which the features of the disclosure can be advantageously implemented is now presented with specific reference to FIG. 6. Within this example, a user mobile (cellular) device operates in both 4G LTE and CDMA 1xRTT, and includes two separate modems that support communication via the respective technology. The user mobile device can be simultaneously connected via both 4G LTE and CDMA 1xRTT, and the processes involved in managing the various activities for each radio connection independently (e.g., scanning, monitoring of control and broadcast info, and cell change/reselection) causes an excessive drain on the device's power. Additionally, the user mobile device can continually drain power even when no calls are being received by the device. Within the example scenario, the user of the mobile device registers with or activates a user account at a communication service that supports voice call forwarding and/or redirection, such as Google Voice™, for example. This registration occurs at some earlier time, which is indicated as T=−t2 at the mobile device and T=−s2 at the communication service. In one embodiment, the user also registers with or establishes a user account with a messaging service, such as Google Talk®, as one example. Following activation of the user accounts, the user registers the mobile device number with the user account established with the communication service, as indicated at time T=−t1, −s1. As one additional pre-requisite to the implementation of the disclosure, the user is assigned a second phone number (independent of the cellular phone number), which can then be used by the user for all voice and SMS communication. The communication service receives and processes calls placed to the second phone number.

When the mobile device is later connected to the Internet, via a WiFi connection using the second modem of the device, the mobile device registers with the server of the communication service, at time T=t0, s0. The connection can be established indirectly through the messaging service, in one or more embodiments where the two services are linked. The mobile device then places on or more of the cellular modems (e.g., 2G/3G/4G, etc.) into a sleep mode, and then conducts all data activity over the alternate Internet connection (using the WiFi modem connection). This series of actions occurs at time T=t3, with optional processes occurring at time T=t1 (confirming WiFi connection to communication service) and T=t2 (sending a registration signal or ping to the wireless network, if the network is accessible). Between times T=t3 and t4, the mobile device monitors for a notification and also periodically awakens the cellular modem and exchange required "timing" parameters.

The communication service then receives an incoming call at time T=s3 and forwards a notification of the incoming call at time T=s4 to the mobile device over the WiFi network. The mobile device receives the notification at time T=t4 and awakens the cellular modem at time T=t5. Concurrently with the notification, the communication service also forwards a page trigger to the wireless network subscribed to by the mobile device, which triggers the network to generate and issue a page to the mobile device. The mobile device then receives the page at time T=t6. The communication service also forwards the call to the mobile device's phone number at time T=s7. The user of the mobile device can accept the page (T=t7) and subsequently receives the call via the cellular modem at time T=t8.

The above described aspects of the disclosure can also be used to address power consumption issue with multiple cellular RATs being simultaneously active on the mobile device. For example, when an LTE/1x device is in LTE coverage, the device registers itself with the communication service and conducts all data activity over the LTE connection. The mobile device also enters into a special mode for 1xRTT where the device performs a significant number of activities related to 1xRTT less frequently (e.g., paging monitoring, measurements, and cell selection/reselection). Then, if a call is placed to the second phone number at the communication service, the mobile device receives an incoming call indication, which is sent by the server of the communication service over the LTE connection, and the device reverts back to normal 1xRTT operation.

Figure 7:
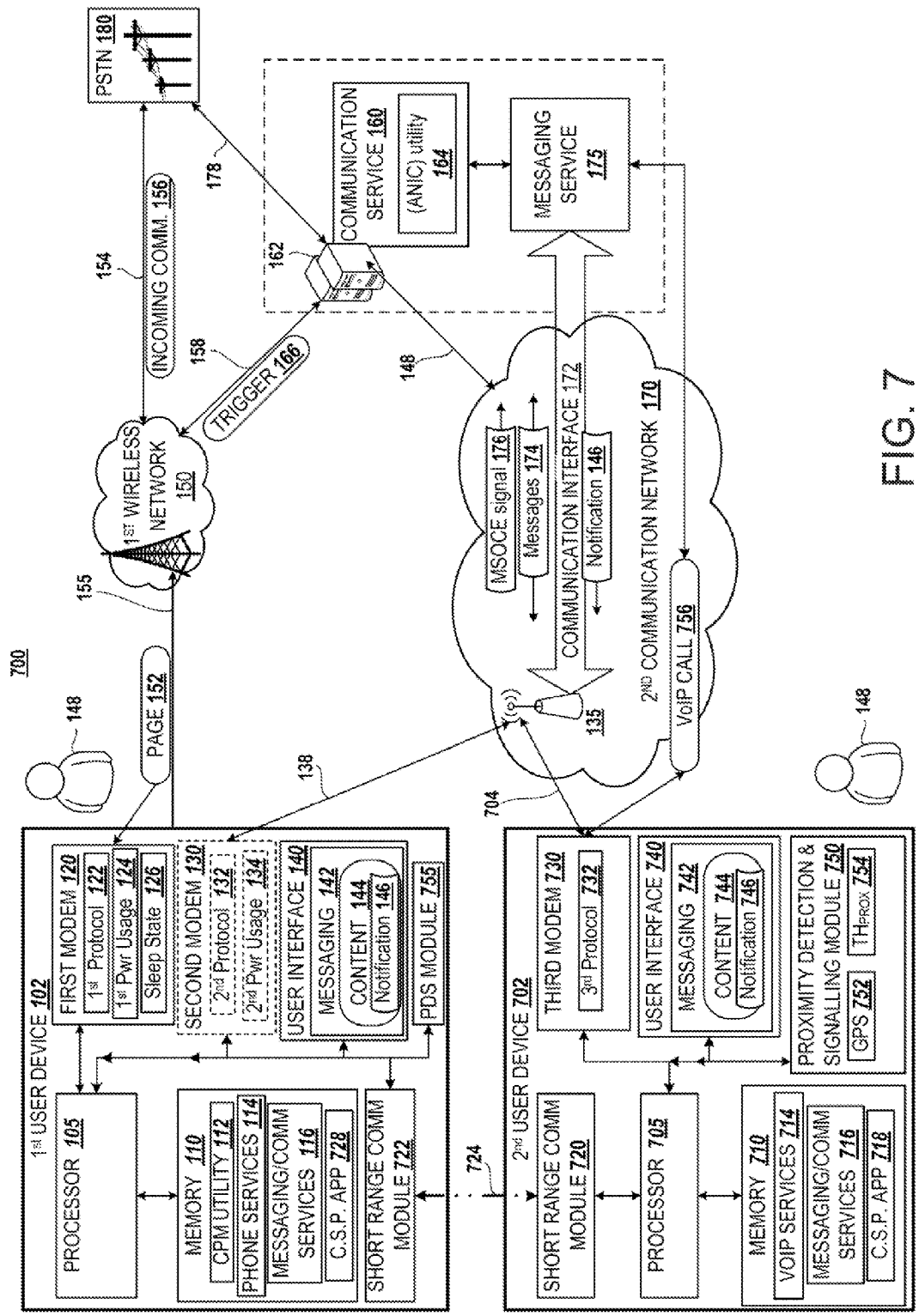
FIG. 7 is a high-level block diagram representation of an example dual network communication environment having two user devices, both capable of communicating with a communication service that enables implementation of reduced power consumption features of at least one of the user devices, according to one alternate embodiment.

FIG. 7 illustrates a dual user device communication environment 700 in which a second user device is provided to enable performance of a data session with the messaging service and receive call-redirection from the communication service 160 while the first modem 120 of the WCD 102 is in a sleep state. In FIG. 7, which is an alternate embodiment to FIG. 1, the majority of the components of the different primary devices are similar to those presented in FIGS. 1 and 2. Thus the description of FIG. 7 will focus mainly on those newly added components and, in particular, the components and interconnectivity of second user device 702. As shown, second user device 702 includes processor 705, which is coupled to memory 710, short range communication module 720, third modem 730, user interface 740, and proximity detection module 750. Memory 710 includes VoIP services application 714, messaging and communication services module 716, and client server protocol (C.S.P) application 718. Messaging and communication services module 716, and C.S.P. application 718 provide code that executes on processor 705 to implement or control server of the functional features described herein that occur at or on second user device 702. Third modem 730 operates according to a third communication protocol 732, which can be similar to second communication protocol 132, for example, and third modem 730 enables communicative access to and data and voice exchange with second communication network 170. User interface 740 includes a messaging interface 742 that provides content 744 and in certain use cases, one or more notifications 746. Proximity detection module 750 enables second user device 702 to determine a relative proximity of WCD 102 to second user device 702 to determined when to implement certain of the features of the alternate embodiment. Proximity detection module 750 can include a GPS module 752 or other form of position detection modules. Proximity detection module 750 can also include a threshold proximity value 754. In the described embodiments, both WCD 102 and second user device 702 are controlled by the same user 148. To complement the functionality of proximity detection and messaging exchange, WCD 102 is configured with C.S.P. application 728 and short range communication module 724. WCD 102 and second user device 702 communicate via respective short range communication modules 720, 722 over an established short range communication channel 724.

As one additional aspect of this alternate embodiment, the communication service 160 is configured to recognize when the user 148 of WCD 102 is signed-in and is attentive to a connected second user device 702 that is in communicative proximity to the WCD 102. To support the functional features of the communication service 160 in this alternate embodiment, communication service 160 is configured with additional functional components. As provided by FIG. 3, communication service 160 includes a call redirection utility 328 that includes a connection quality parameter 364, to determine when or whether the IP connection has at least a threshold quality to connect an incoming call as a VoIP call, proximity parameter 366, to track a proximity of the WCD 102 to the second user device 702, and a hand-off utility 368, to identify when to handoff the call as a VoIP call versus forwarding over the first network for completion as a cellular call following device notification. Communication service 160 also includes primary device identifier 360, which can be synonymous with the device's registered phone number, and a user activeness monitor 362, which tracks when a user 148 of the second user device 702 is present and/or interactive with the second user device 702. These components are shown in dashed boxes to indicate that they are optional within the above described advanced notification embodiments that do not necessarily require a second user device or include call redirection.

In this alternate embodiment, the WCD 102 operates as the primary communication device, and includes one or both of cellular modem (first modem 120) and/or WiFi modem (second modem 130). One or both of these modems 120/130 can be shut down or put in sleep mode, while data traffic communicated over the second communication network 170 (which can be another wireless network, in one embodiment) is diverted or sent directly to the second user device 702. Accordingly, power and data consumption are reduced on the primary communication device, while the user 148 is able to monitor, receive, and/or interact with content, notifications, and portable apps that the user would otherwise receive and interact with on the primary device. As one aspect, the second user device 702 is assumed to have acceptable power and data consumption characteristics, although there is no requirement that this be less than that of the primary device. Also, the second user device 702 can be connected to the second network via a wireless connection or a direct wireless connection in alternate embodiments.

One facilitator of this dual user device implementation is the portability and seamlessness of multi-platform Apps, such as Google® Apps, which can be run on a plurality of different devices. Thus, as one example, the second user device 702 can be a personal computer or an interactive television having a robust Internet or landline phone connection. With this specific implementation, and others, an additional aspect of the disclosure can involve configuring the communication service 160 to provide call redirection, whereby an incoming communication 156 that would otherwise be routed to the WCD 102 can instead be routed to the second user device 702 when specific conditions are in play. Among these specific conditions are the following: (a) the first modem 120 is in the sleep mode; (b) the WCD 102 is proximal to the second user device 702; (c) the second user device 702 is actively running a messaging application that connects to the communication service 160 and is able to provide real-time information about the location status of the WCD 102 relative to the second user device 702. Thus, according to the described embodiment, the second user device 702 would stand in to receive incoming communications 156 for the WCD 102 until the communication service 160 detects or is made aware of a termination of call redirecting (TCR) condition. Possible examples of a TCR condition includes detecting that the user is no longer attentive to the second user device, which can be inferred by one or more of: (i) user log-off from the second user device 702, (ii) a prolonged lack-of-interaction; (iii) lack of second user device presence, as detected through a proximity or image-based detection system; (iv) movement of the primary device away from the second user device. In one embodiment, the movement of the primary device can be detected by a user wearable device 286 that loses Bluetooth or similar short-range connectivity outside of a proximity threshold. In another embodiment, the movement and/or relative locations of the two devices can be determined via triangulation and/or global positioning system (GPS) location evaluation. The presence of any of the possible CRT conditions would trigger at least one of the communication service 160, the second user device 702, or the WCD 102 to alert the WCD to awaken the first modem(s) 120/130 within the WCD 102 in order to minimize any perceived loss in connectivity with the various communication networks.

According to one aspect, in order to put the cellular modem (first modem 120) on the WCD 102 into sleep mode when the user signs in to the messaging service via the messaging application executing on the second user device 702, an indication is provided to the WCD 102 when the user 148 signs in to the messaging application 742 on the second user device 702. In one embodiment, this indication can be provided using a client server protocol (C.S.P.) module that executes on and communicates between the WCD 102 and the second user device 702 over a short range low power radio technology signal 770. Possible examples of the short range low power radio technology signal 770 includes but is not limited to WiFi, Bluetooth, IR, which are respectively enabled via corresponding communication mechanisms 240 available on the two devices 102/702. When the user signs in to the user account on the messaging service via the second user device 702, the secondary device sends a notification of the "signed-in and active" status to the WCD 102. The WCD 102 then places its cellular modem 120 (and, in one embodiment, most other functionality in the device) to sleep, conserving power. The WCD 102 then only monitors the link to the second user device 702 for an indication that a trigger event or condition has occurred that requires the WCD 102 to exit sleep mode. According to one aspect of the disclosure, while in sleep mode, the WCD 102 either does not monitor cellular signals and pages, or monitors them very infrequently, thus conserving power at the WCD 102.

According to one or more alternate embodiments, the at least one trigger event or condition can include at least one of: (a) detection of a termination of the close range communication channel; (b) receipt of a notification of an incoming communication being forwarded for completion over the first network; (c) detection of a termination of the active running of the messaging application at the second user device 702; (d) receipt of a user-inactive notification indicating that a user 148 is no longer attentive to the second user device 702; (e) detecting separation of the WCD 102 beyond a proximity threshold range of the second user device 702; (f) detecting separation of a first user wearable device 286 from within a proximity range of the second user device 702.

According to another aspect, when the user 148 is signed in via the second user device 702 and the WCD 102 is in sleep mode, incoming calls at the communication service 160 are forwarded to and received on the second user device 702. As an example, and without limitation on the disclosure, incoming calls can be delivered to the second user device 702 as VoIP calls 756. When the user 148 needs to move away from the second user device 702 while on a call (e.g., user needs to shut down his computer, operating as the second user device 702, and leave his home or office), the user 148 is provided a selectable option, via the messaging application user interface (UI) or the VoIP UI, to trigger a call transfer feature on the second device, utilizing the functionality of the C.S.P. application 720. Activation of the call transfer feature causes the second user device 702 to perform the following functions (a) send an indication to the WCD 102 to exit sleep mode, (b) set up a 3-way call by adding the WCD 102 to the ongoing call (via one of VoIP or cellular modem, in alternate embodiments), and (c) in response to completion of the call connection to the WCD 102, drop the call at the second user device 702.

It is appreciated that the diversion of data traffic to the second user device 702 can be performed using any known technique. In one embodiment, a computer can be set up to allow a user to mirror applications and/or activities running on the user's mobile device (WCD 102) onto the computer's browser. It is similarly possible to transfer an ongoing YouTube session from the WCD 102 to the second user device 702, as one example implementation. The disclosure thus provides a system for delivery of an early notification over a non-operator-owned communication path such as a WiFi network. The user of the WCD is alerted via the active WiFi or Ethernet connection of the incoming call and by monitoring the established communication channel, the subscriber device can awake the cellular modem in time to receive the incoming cellular call before the call is sent to voicemail. The effect of the placement of the modem into the sleep state is a reduction in power and data consumption that would otherwise occur on a primary communication device modem. However, the other aspects of configuring the modem to register with and periodically checking into the cellular network, even while in the sleep mode, enable the user device to be sufficiently connected and reachable at all times on the primary communication device modem. Thus, the WCD is able to present the appearance of uninterrupted connectivity, while reducing power consumption and extending battery life.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method for minimizing power consumption in a communication device that includes at least a first modem and a second modem, each supporting a communication protocol for respectively connecting to at least one communication network, the method comprising:
in response to detecting communicative access via the second modem to a communication network on which a communication service is accessible:
establishing a communication channel with the communication service via the second modem, wherein the communication service is configured to respond to receipt of an incoming communication that will be routed to the communication device via a first communication network by: (i) automatically transmitting a notification via a second communication network to the second modem and (ii) forwarding the incoming communication via the first communication network to the first modem;
in response to establishing the communication channel with the communication service, placing the first modem in a sleep state; and
in response to receipt, at the second modem, of the notification of the incoming communication:
awakening the first modem to an active state to enable receipt of signaling corresponding to the incoming communication via the first modem.

2. The method of claim 1, further comprising:
subsequent to the awakening of the first modem, receiving, at the first modem, a page from the first communication network addressed to a first identifier associated with the communication device, wherein the page is associated with a forwarding of the incoming communication by the wireless service.

3. The method of claim 1 further comprising:
subsequent to receiving the signaling corresponding to the incoming communication, establishing a connection of the incoming communication, via the first modem.

4. The method of claim 1, further comprising:
registering the communication device with the communication service, wherein the communication service associates the communication device with a first identifier assigned to a registered account at the communication service of a user of the first device.

5. The method of claim 4, wherein registering the communication device comprises:
transmitting registration information, via the second modem, to a server of the communication service, wherein the registration information triggers the communication service to issue the notification when forwarding an incoming communication over the first communication network.

6. The method of claim 4, wherein the incoming communication is a phone call and the first identifier comprises a first phone number utilized for receiving the incoming call, which is automatically routed via the first communication network to a second phone number associated with the communication device.

7. The method of claim 1, further comprising:
registering the communication device, via the first modem, with the first communication network, prior to triggering the first modem to enter the sleep state; and
periodically placing the first modem in an active state in order to exchange parameters with the first communication network that are required to maintain the first modem in a ready state for quickly establishing a communication channel with the first communication network.

8. The method of claim 1, wherein:
triggering the first modem to enter a sleep state comprises at least one of (a) turning off power to the first modem, (b) removing power from one or more power consuming components of the first modem, (c) turning off specific power consuming components of the first modem, (d) intermittently providing power to a subset of components of the first modem that are required to periodically transmit registration parameters to the first wireless network and exchange timing data with a network tower for uplink and downlink communication, (e) placing the first modem in a low power state in which the first modem consumes a limited amount of power but retains operational readiness to enable a quick response to receipt of the incoming communication, and (f) placing the first modem in a state in which the first modem monitors a signal of the first communication network less frequently than the frequency of monitoring of the signal when the first modem is in an active state.

9. The method of claim 1, further comprising, in response to establishing the communication channel with the communication service, initiating a monitoring protocol at the second modem to detect receipt of the notification.

10. The method of claim 1, wherein:
the first communication network operates using at least one first wireless protocol that causes the first modem to consume a first amount of power while in a stand-by mode or a scanning-for-network mode; and the second communication network operates using a second wireless protocol that causes the second modem to consume a second amount of power that is less than the first amount of power, while the second modem is in one of (a) active communication with the second communication network, (b) stand-by mode, and (c) a scanning-for-network mode.

11. A wireless communication device comprising:

a first wireless modem that enables the wireless communication device (WCD) to interface with a first wireless network and perform wireless communication exchange via a first communication channel;

a second wireless modem that enables the WCD to interface with a second wireless network and perform wireless communication exchange via a second communication channel;

at least one processor coupled to the first wireless modem and the second wireless modem:

a communication and power management (CPM) utility that executes on the processor and configures the WCD to:

in response to the second wireless modem being communicatively connected to the second wireless network:

establish, via the second wireless modem, communication with a communication service accessible over the second wireless network, where the communication service provides routing of signaling of an incoming communication to the WCD over the first wireless network and exchange of messages with the WCD over the second wireless network; and set the first wireless modem to a sleep state; and in response to receipt of a notification from the communication service, at the second wireless modem, identifying that the incoming communication is being forwarded to the WCD via the first wireless network:

return the first wireless modem to an active state to enable connection of the incoming communication to the WCD via the first wireless modem following receipt of the signaling of the incoming communication.

12. The WCD of claim 11, wherein:

the CPM module turning the first wireless modem to a sleep state comprises the CPM module configuring the WCD to perform at least one of (a) turn off power to the first wireless modem, (b) remove power from one or more power consuming components of the first wireless modem, (c) turn off specific power consuming components of the first wireless modem, (d) intermittently provide power to a subset of components of the first wireless modem that are required to periodically transmit registration parameters to the first wireless network and exchange timing data with a network tower for uplink and downlink communication, (e) place the first communication modem in a low power state in which the first wireless modem consumes a limited amount of power but retains operational readiness to enable a quick response to receipt of the incoming wireless communication, and (f) place the first wireless modem in an operating mode in which the first wireless modem monitors a signal of the first wireless network less frequently than when the first wireless modem is in an active operating mode.

13. The WCD of claim 11, wherein the CPM module further initiates a monitoring protocol at the second modem to detect receipt of the notification in response to establishing the communication channel with the communication service.

14. The WCD of claim 11, further comprising:

a communication service registration utility that executes on the processor and configures the WCD to:

transmit registration information to a server of the communication service, which registration information configures the communication service to issue the notification prior to or concurrent with forwarding an incoming communication request via the first wireless network.

15. The WCD of claim 11, wherein the communication service:

registers the WCD with a first contact number that is different from a second number of the WCD assigned for use on the first communication network;

maintains communication with the WCD via the second wireless modem;

in response to receiving an incoming communication that will be routed to the WCD via the first wireless network, (i) automatically transmits a notification of the incoming communication to the WCD via the second wireless network and (ii) forwards the incoming communication to the second number of the WCD via the first wireless network.

16. A communication service comprising:

a processor;

a first communication interface enabling communication with a first communication network that supports routing of voice calls and a second communication interface enabling communication with a second communication network;

an advance notification of incoming call (ANIC) utility that executes on the processor and which configures the communication service to:

detect when a registered user device associated with a user account is communicatively connected to the communication service;

in response to receiving an incoming call for a first phone number assigned to the user account:

generate a notification indicating that the incoming call is going to be forwarded to a second phone number associated with the registered user device;

transmit the notification to the registered user device over the second communication interface; and forward the incoming call to the second phone number via the first communication interface.

17. The communication service of claim 16, wherein the ANIC utility forwarding the incoming call to the second phone number comprises configuring the communication service to:

signaling the first communication network to transmit a page to the second phone number; and forward the incoming call.

18. The communication service of claim 16, wherein the ANIC utility further configures the processor to:

receive an input of registration information that sets an ANIC feature to "on" within the user account, which registration information triggers the communication service to issue the notification via the second communication interface prior to or concurrent with forwarding an incoming communication via the first communication interface; and setting the ANIC feature to on within the user account.

19. The communication service of claim 16, further comprising communication service firmware that:
- registers the WCD with a first contact number that is different from a second number of the WCD assigned for use on the first communication network; and
- maintains an open communication channel with the user device via the second communication interface until terminated by the user device or loss of a connection with the user device.

20. A processor-implemented method of routing communications by a network-accessible communication service, the method comprising:
- a communication service establishing a first communicative connection via a second communication network with a registered user device associated with a user account;
- in response to receiving an incoming call for a phone number assigned to the user account:
  - generating a notification indicating that the incoming call is going to be forwarded to a second phone number associated with the registered user device via a first communication network;
  - transmitting the notification to the registered user device over the second communication network; and
  - forwarding the incoming call to the second phone number via the first communication network.

21. The method of claim 20, wherein forwarding the incoming call to the second phone number comprises:
- first signaling the first communication network to send a page to the second phone number; and
- forwarding the incoming call for connection on the first communication network, wherein the incoming call can be connected on the first communication network if the page is accepted by the user device.

22. The method of claim 20, further comprising:
- receiving an input of registration information that sets an ANIC feature to "on" within the user account, which registration information triggers the communication service to issue the notification via the second communication interface prior to or concurrent with forwarding an incoming communication request via the first communication interface; and
- setting the ANIC feature to "on" within the user account.

23. The method of claim 20, further comprising:
- registering the WCD with a first contact number that is different from a second number of the WCD assigned for use on the first communication network; and
- maintaining an open communication channel with the user device via the second communication interface until terminated by the user device or loss of a connection with the user device.

* * * * *